United States Patent
Ng et al.

(10) Patent No.: US 6,822,814 B2
(45) Date of Patent: Nov. 23, 2004

(54) WRITE HEAD COLLISION DETECTION USING MR READ ELEMENT IN DISC DRIVES

(75) Inventors: WeiLoon Ng, Singapore (SG); Myint Ngwe, Singapore (SG); QuekLeong Choo, Singapore (SG); EngHock Lim, Singapore (SG); KokHoe Chia, Singapore (SG); CheeWai Lum, Singapore (SG)

(73) Assignee: JPMorgan Chase Bank, As Collateral Agent, New York, NY (US)

( * ) Notice: Subject to any disclaimer, the term of this patent is extended or adjusted under 35 U.S.C. 154(b) by 315 days.

(21) Appl. No.: 09/896,359

(22) Filed: Jun. 29, 2001

(65) Prior Publication Data

US 2002/0097513 A1 Jul. 25, 2002

Related U.S. Application Data

(60) Provisional application No. 60/247,328, filed on Nov. 10, 2000.

(51) Int. Cl.[7] ............................................. G11B 27/36
(52) U.S. Cl. ............................ 360/31; 360/75; 360/69
(58) Field of Search ......................... 360/31, 210, 324, 360/319, 75, 69; 430/30; 324/210

(56) References Cited

U.S. PATENT DOCUMENTS

| | | | |
|---|---|---|---|
| 5,233,482 A | | 8/1993 | Galbraith et al. ............. 360/46 |
| 5,408,365 A | * | 4/1995 | Van Doorn et al. ........... 360/46 |
| 5,537,034 A | | 7/1996 | Lewis ........................ 324/212 |
| 5,666,237 A | | 9/1997 | Lewis .......................... 360/75 |
| 5,729,408 A | | 3/1998 | Kikitsu ....................... 360/104 |
| 5,737,157 A | | 4/1998 | Gill ............................. 360/113 |
| 5,771,141 A | | 6/1998 | Ohtsuka et al. ............. 360/113 |
| 5,793,207 A | | 8/1998 | Gill ............................. 324/252 |
| 5,793,576 A | | 8/1998 | Gill ............................. 360/113 |
| 5,798,885 A | | 8/1998 | Saiki et al. ............... 360/77.08 |
| 5,808,825 A | | 9/1998 | Okamura ...................... 360/75 |
| 5,822,139 A | | 10/1998 | Ayabe .......................... 360/31 |
| 5,859,753 A | | 1/1999 | Ohtsuka et al. ............. 360/113 |
| 5,880,899 A | | 3/1999 | Blachek et al. .............. 360/66 |
| 5,982,568 A | * | 11/1999 | Yamamoto et al. .......... 360/31 |
| 6,097,559 A | | 8/2000 | Ottesen et al. ................ 360/31 |
| 6,137,643 A | | 10/2000 | Flynn .......................... 360/25 |
| 6,178,053 B1 | | 1/2001 | Narita ......................... 360/25 |
| 6,181,520 B1 | | 1/2001 | Fukuda ..................... 360/244.1 |
| 6,216,242 B1 | * | 4/2001 | Schaenzer ..................... 360/31 |
| 6,379,851 B1 | * | 4/2002 | Innes .......................... 430/30 |
| 6,384,997 B1 | * | 5/2002 | Wu et al. ...................... 360/46 |
| 6,504,687 B1 | * | 1/2003 | Miyatake et al. ........... 360/319 |
| 6,510,031 B1 | * | 1/2003 | Gambino et al. ........... 360/324 |
| 6,522,134 B1 | * | 2/2003 | Gill ............................. 324/210 |

* cited by examiner

Primary Examiner—David Hudspeth
Assistant Examiner—Rocio Colon

(57) ABSTRACT

An apparatus and associated method for detecting head collision with disc media, or other matter, during a write operation is disclosed. The method and apparatus generally monitor the resistance of an MR element on the head in order to detect a temperature increases indicative of a head collision. The resistance can be compared to a pre-selected threshold to generate an output indicative of head collision.

14 Claims, 4 Drawing Sheets

WRITE HEAD COLLISION DETECTION USING MR READ ELEMENT IN DISC DRIVES

CROSS-REFERENCE TO RELATED APPLICATION

This application claims the priority of earlier filed co-pending provisional patent application No. 60/247,328 filed Nov. 10, 2000 and entitled "Write Head Collision Detection Using the MR Read Element in Disk Drives."

FIELD OF THE INVENTION

The present invention relates generally to data storage devices, and more particularly, but not by limitation, to an apparatus and associated method that facilitate collision detection during write operations.

BACKGROUND OF THE INVENTION

Disc drives of the type known as "Winchester" disc drives or hard disc drives are well known in the industry. Such disc drives record digital data on a plurality of circular, concentric data tracks on the surfaces of one or more rigid discs. The discs are typically mounted for rotation on the hub of a spindle motor.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative hydrodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspensions or flexures.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent to the outer diameter of the discs. The pivot shaft is mounted such that its central axis is normal to the plane of rotation of the discs. An actuator housing is mounted to the pivot shaft, and supports a flat coil which is suspended in the magnetic field of an array of permanent magnets, which are fixedly mounted to the disc drive housing base member. On the side of the actuator housing opposite to the coil, the actuator housing also typically includes a plurality of vertically aligned, radially extending actuator head mounting arms, to which the head suspensions mentioned above are mounted. When controlled DC current is applied to the coil, a magnetic field is formed surrounding the coil which interacts with the magnetic field of the permanent magnets to rotate the actuator housing, with the attached head suspensions and head assemblies, in accordance with the well-known Lorentz relationship. As the actuator housing rotates, the heads are moved radially across the data tracks along an arcuate path.

As the physical size of disc drives has decreased historically, the physical size of many of the disc drive components has also decreased to accommodate this size reduction. Similarly, the density of the data recorded on the magnetic media has been greatly increased. In order to accomplish this increase in data density, significant improvements in both the recording heads and recording media have been made.

For instance, the first rigid disc drives used in personal computers had a data capacity of only 10 megabytes, and were in the format commonly referred to in the industry as the "full height, 5¼" format. Disc drives of the current generation typically have a data capacity of many gigabytes in a 3½" package which is only one fourth the size or less of the full height, 5¼" format. Even smaller standard physical disc drive package formats, such as 2½" and 1.8", have been established. In order for these smaller envelope standards to gain market acceptance, even greater recording densities must be achieved.

The recording heads used in disc drives have evolved from monolithic inductive heads to composite inductive heads (without and with metal-in-gap technology) to thin-film heads fabricated using semi-conductor deposition techniques to the current generation of thin-film heads incorporating inductive write and magneto-resistive (MR) read elements. This technology path was necessitated by the need to continuously reduce the size of the gap in the head used to record and recover data, since such a gap size reduction was needed to reduce the size of the individual bit domain and allow greater recording density.

Since the reduction in gap size also meant that the head had to be closer to the recording medium, the quest for increased data density also lead to a parallel evolution in the technology of the recording medium. The earliest Winchester disc drives included discs coated with "particulate" recording layers. That is, small particles of ferrous oxide were suspended in a non-magnetic adhesive and applied to the disc substrate. With such discs, the size of the magnetic domain required to record a flux transition was clearly limited by the average size of the oxide particles and how closely these oxide particles were spaced within the adhesive matrix. The smoothness and flatness of the disc surface was also similarly limited. However, since the size of contemporary head gaps allowed data recording and retrieval with a head flying height of about twelve microinches (0.000012 inches) or greater, the surface characteristics of the discs were adequate for the times.

Disc drives of the current generation incorporate heads that fly at nominal heights of a few microinches or less. Obviously, with nominal flying heights in this range, the surface characteristics of the disc medium must be much more closely controlled than was the case only a short time ago.

To ensure that data is correctly written to a track of the magnetic media in the disc drive, the recording head should be kept within the center of the recording track and its flight height kept within desired tolerances. While off-track errors can be detected by the servo positioning system, flight height errors are less easily detectable. Flight height errors are introduced when vertical vibrations are introduced on the arm where the recording head is mounted. One of the possible causes of such vibration is the collision of the recording head with foreign objects on the disc media. Another possible cause of such vibration is when the entire drive itself is subjected to a severe physical shock. During read operations this problem is currently addressed as the thermal asperity (TA) symptom. This symptom is characterized by a sudden change in resistance in the MR element that is used to read data from the disc media. However, during the write operation, such head collisions with foreign objects on the media generally remain undetected. As a result, data is written to the media with the recording head oscillating in a vertical manner resulting in a recorded signal of inconsistent amplitude being recorded into the media. This recorded signal may not be able to read back subsequently.

While attempts have been made to identify collisions that occur during write operations, such attempts generally involve relatively complex algorithms that necessitate addition computational overhead. For example, U.S. Pat. No. 6,097,559 to Ottesen et al. describes a system and method for detecting head-to-disc contact in-situ for a direct access storage device using a position error signal. The '559 patent describes obtaining position error signal measurement values for several revolutions and storing such values in memory. The patent further describes using a processor to calculate the non-repeatable run-out (NRRO) values associated with the position error signals. The NRRO power ratios are disclosed as an indication of intermittent disc contact.

While previous attempts have provided some indication of head-collisions during write operations, they have involved added complexity and the associated performance decrease for processor overhead, reducing their suitability for full-time use during all write operations. Thus, there exists a need to provide simple detection of head collisions during write operations without increasing complexity or adding substantial component costs.

SUMMARY OF THE INVENTION

An apparatus and associated method for detecting head collision with disc media, or other matter, in a disc drive during a write operation is disclosed. A method in accordance with one embodiment includes monitoring the resistance of an MR element on the head in order to detect a temperature increase indicative of a head collision. The resistance can be compared to a pre-selected threshold to generate an output indicative of head collision.

DETAILED DESCRIPTION OF ILLUSTRATIVE EMBODIMENTS

Figure 1:
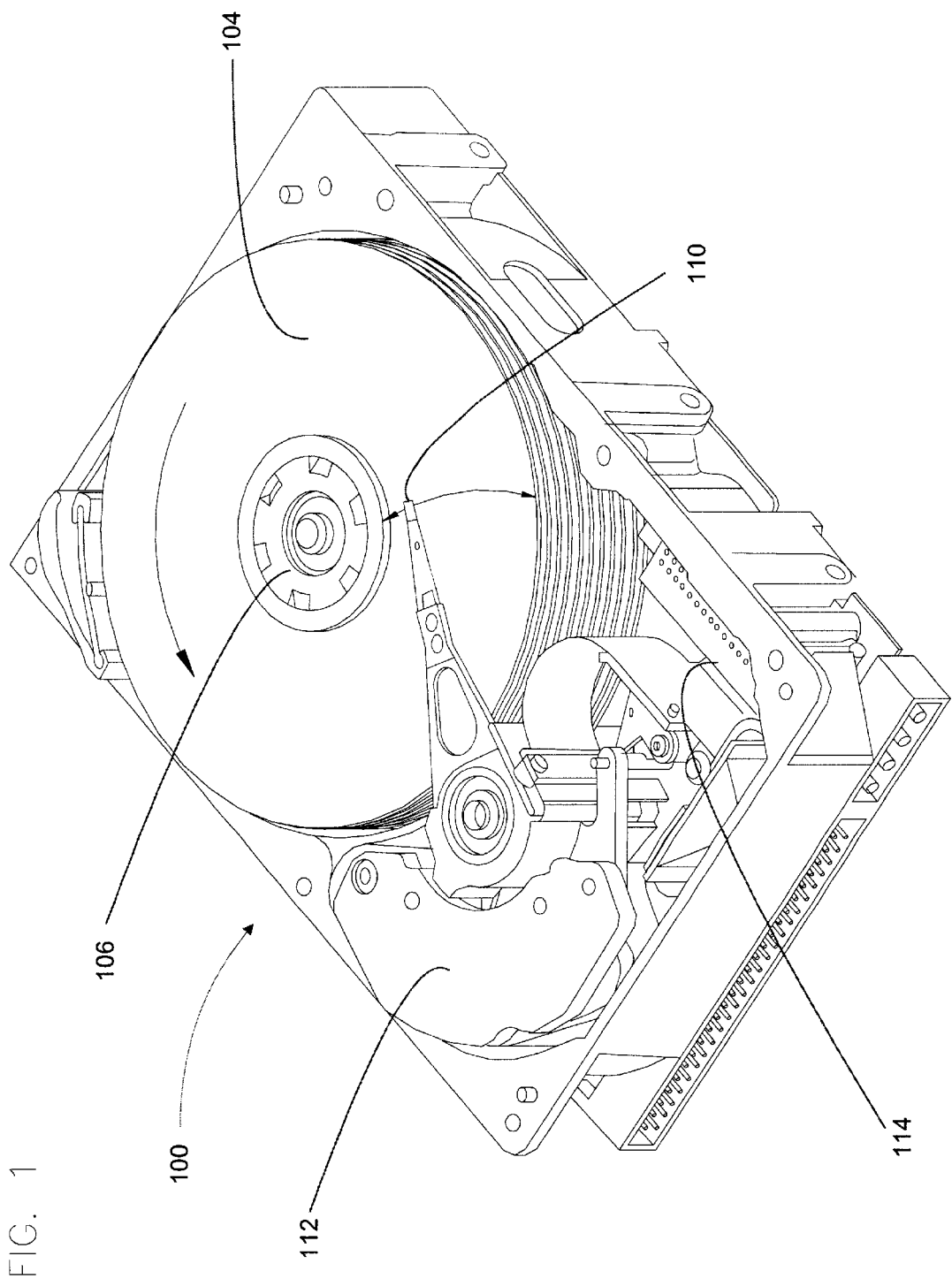
FIG. 1 is perspective view of a disc drive in which embodiments of the present invention are particularly useful.
Figure 2:
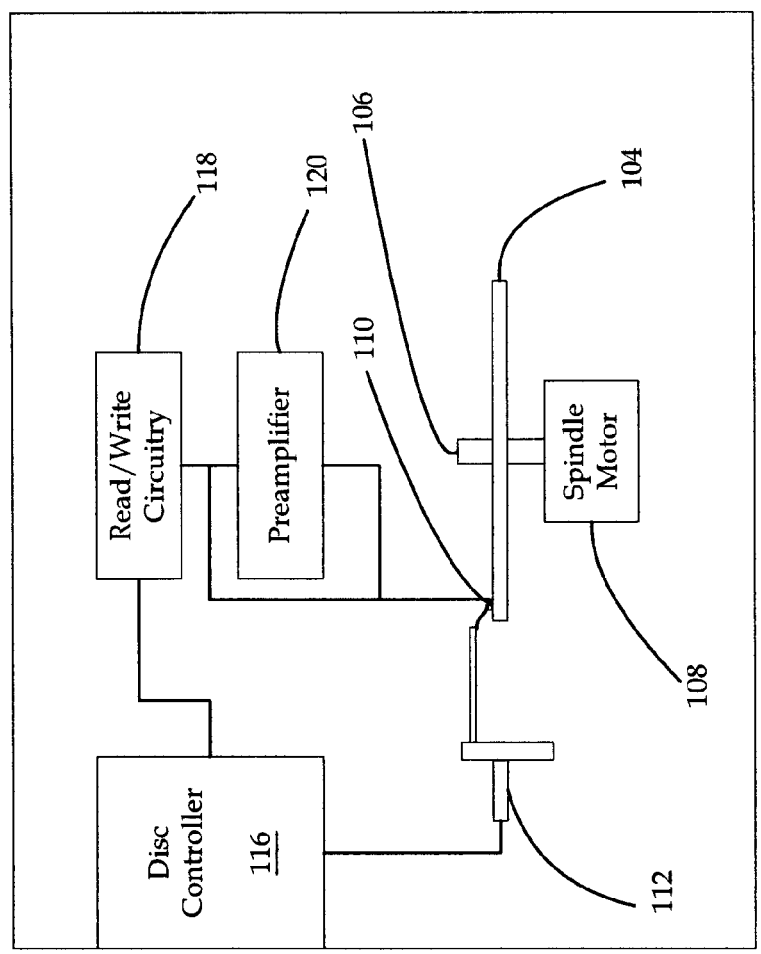
FIG. 2 is a system block diagram of a disc drive in which embodiments of the present invention are particularly useful.

FIG. 1 is a diagrammatic view of disc drive 100, which is adapted to couple to a computer. When so coupled, the computer transfers data to and reads data from disc drive 100. Disc drive 100 includes discs 104, spindle 106, spindle motor 108 (shown in FIG. 2), transducer head 110, actuator 112, and board electronics 114. Board electronics 114 include suitable control circuitry, such as disc controller 116, for effecting control within drive 100.

Discs 104 are fixed about spindle 106, which is coupled to spindle motor 108 such that energization of spindle motor 108 causes spindle 106 and discs 104 to rotate. When discs 104 rotate, heads 110 fly above/below discs 104 on thin films of air or liquid and carry transducers for communicating with the respective disc surface. Several alternative types of heads can be used, such as magnetic or optical heads. Actuator 112 is coupled to electronics 114 and is adapted to move heads 110 relative to the surfaces of discs 104 in response to an actuation signal from electronics 114.

When data is to be written to discs 104, disc controller 116 provides appropriate signals to read/write circuitry 118 thereby causing read/write circuitry 118 to generate signals at the appropriate transducer on head(s) 110. The transducer generates changes at individual bit positions, as head 110 flies above disc 104, based upon the signals received from read/write circuitry 118. Generally, the transducer generates magnetic fields which selectively magnetize the individual bit positions and thereby store data.

When data is to be read from discs 104, a transducer (generally a magnetoresistive element) on head 110 generates a signal based upon the individual bit positions as head 110 flies above disc 104. The signal is amplified by preamplifier 120 and provided to read/write circuitry 118. Data is recovered based upon the signal so received by read/write circuitry 118 and is provided to disc controller 116.

Embodiments of the present invention track the resistance of the MR element during write operations in order to detect head collisions with the media. Generally, detection of recorded information in a magnetic disc drive with an MR element head is effected by measuring a change of resistance of the MR element given by:

$$R_{total} = R_{mr} + \Delta R$$

$\Delta R$ usually occurs within 2% of $R_{mr}$, and $R_{mr}$ is the DC resistance of the MR element. In known read/write channel implementations, the read channel back-end (second stage with high gain) preamplifier is usually turned off during write operations because the magnetic field generated by the write head is so large that it forces the preamplifier into a saturation mode most of the time. Thus, the read signal is read as:

$$R_{signal} = \Delta R_{max}.$$

Figure 3:
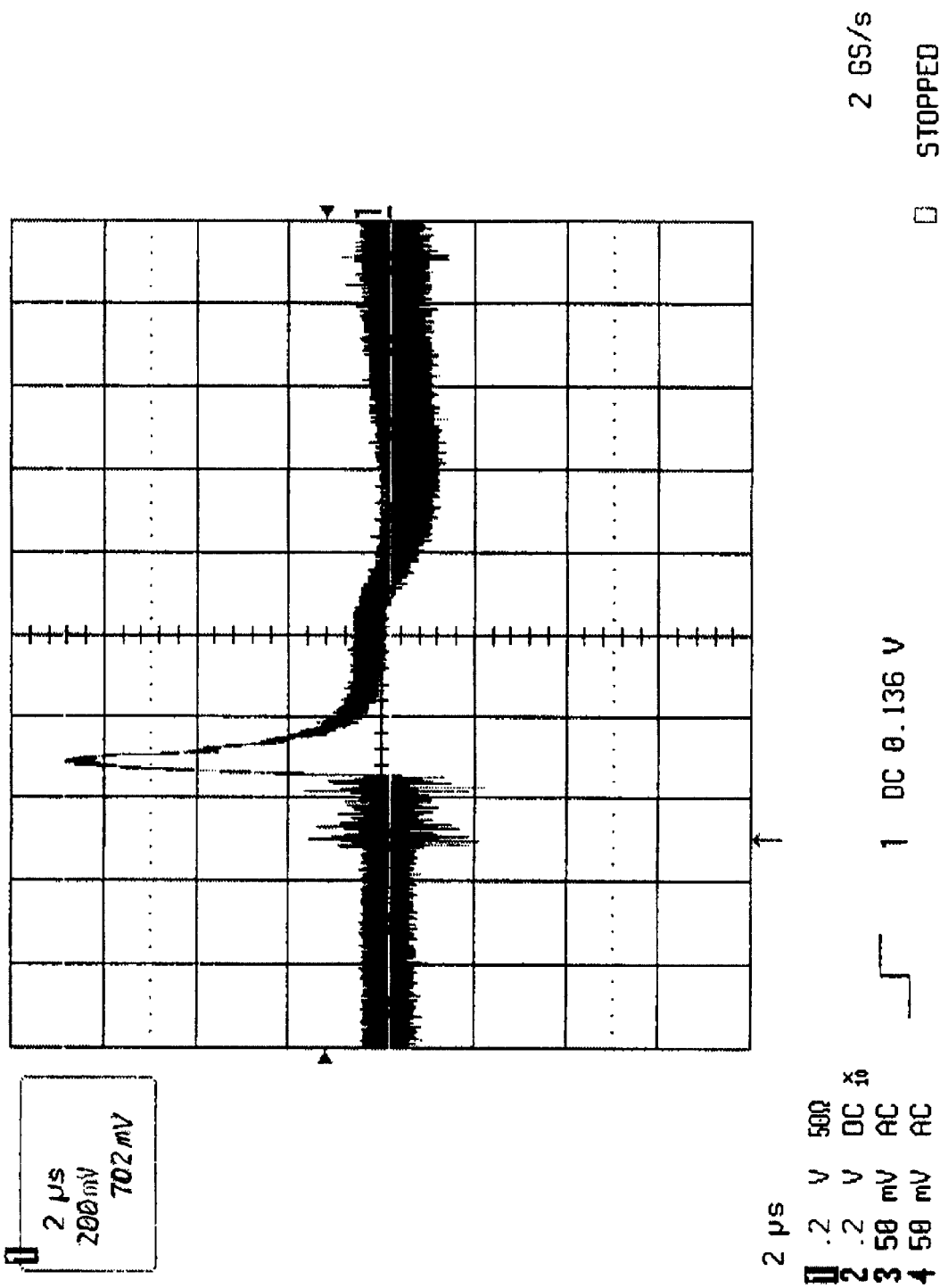
FIG. 3 is a chart illustrating MR resistance over time during which a thermal asperity event was detected.

However, during the write operation, the interest in the MR element is not in the signal content. When a collision of the head with a foreign object or the media itself occurs, the sudden heat generated by the collision increases the temperature of the MR element and thereby raises its resistance substantially. FIG. 3 is a chart of an MR signal illustrating a spike that occurs during a collision. Essentially, using the MR element to detect the relatively large change of resistance ($\Delta R_{temperature}$) during the write operation provides a simple and effective method to detect, in essentially real-time, head collisions. Thus:

$$R_{total} = R_{MR} + \Delta R_{max} + \Delta R_{temperature}$$

By comparing $\Delta R_{temperature}$ with a pre-selected threshold, a signal can be generated indicating collision and thus, requiring the disc drive to perform appropriate action in response to the collision. For example, such action can include retrying the write operation, storing the write data at an alternate location on the disc, storing information on the disc indicating the location of the collision, or any other appropriate actions.

Embodiments of the present invention are particularly suited for disc drives that employ giant magnetoresistive (GMR) heads. The read-back voltage at the MR element can be determined by multiplying the MR resistance with the current flow. Hence, the instantaneous voltage V(t) during write mode is given as:

$$V(t) = R_{total} \cdot I(t) = (R_{mr} + \Delta R_{max} + \Delta R_{temperature}) \cdot I(t),$$

where I(t) is the instantaneous current flow across the reader element. $\Delta R_{max}$ is generally approximately 2.5% of $R_{mr}$ for a GMR head.

When a collision occurs, it causes the MR resistance to increase tremendously due to the abrupt temperature rise, thereby causing current flow to decrease. This event is called a thermal asperity (TA) and is illustrated in FIG. 3.

Preferably, MR resistance is measured after the preamplifier output. During a TA event, the sensed signal is generally much larger than the normal signal amplitude. For example, as illustrated in FIG. 3, the signal increased substantially to about $VTA_{peak}=702$ mV in the TA event (compared to the original 2T amplitude of $V_{o\text{-}peak}=61.5$ mV).

By using a preamplifier to sense the resistance change in terms of voltage and current, only the minute voltage variation $\Delta V$ or current $\Delta I$ will be amplified. Calculations for obtaining $\Delta R_{temperature}$ are illustrated as follows:

Case 1 Current-biased and voltage-sensed preamplifier:

Normal signal $\Delta V_1 = \Delta R_{max} \cdot I_{DC\ Bias,FIXED}$

TA event $\Delta V_2 = (\Delta R_{max} + \Delta R_{temperature}) \cdot I_{DC\ Bias,FIXED}$ $$\frac{\Delta V_2}{\Delta V_1} = \left(1 + \frac{\Delta R_{temperature}}{\Delta R_{max}}\right).$$

By substituting TA $VTA_{peak}=702$ mV and 2T $V_{o\text{-}peak}=61.5$ mV, it is observed that $R_{temperature}$ is approximately ten times larger than $\Delta R_{max}$.

Case 2 Voltage-biased and current-sensed preamplifier:

Normal signal $\Delta V_{DC\ Biased,FIXED} = \Delta R_{max} \cdot \Delta I_1$

TA event $\Delta V_{DC\ Biased,FIXED} = (\Delta R_{max} + \Delta R_{temperature}) \cdot \Delta I_2$ $$\frac{\Delta I_1}{\Delta I_2} = \left(1 + \frac{\Delta R_{temperature}}{\Delta R_{max}}\right),$$

where $\Delta R_{temperature}$ can be estimated from the ratio of $\Delta I_1$ to $\Delta I_2$. Since $\Delta R_{temperature}$ is a positive value, $\Delta I_1$ is larger than $\Delta I_2$.

In the above equations, it is observed that the large voltage and current changes are fully reflected by $\Delta R_{temperature}$. By monitoring the resistance $R_{total} = R_{mr} + \Delta R_{max} + \Delta R_{temperature}$ during writing, a threshold $R_{th}$ can be set to trigger the channel when a foreign particle collision, or other collision type event occurs. Preferably, in order to obtain smoother TA event detection, a low-pass filter is added to the reader to block the coupled high-frequency noise from the write transition.

Figure 4:
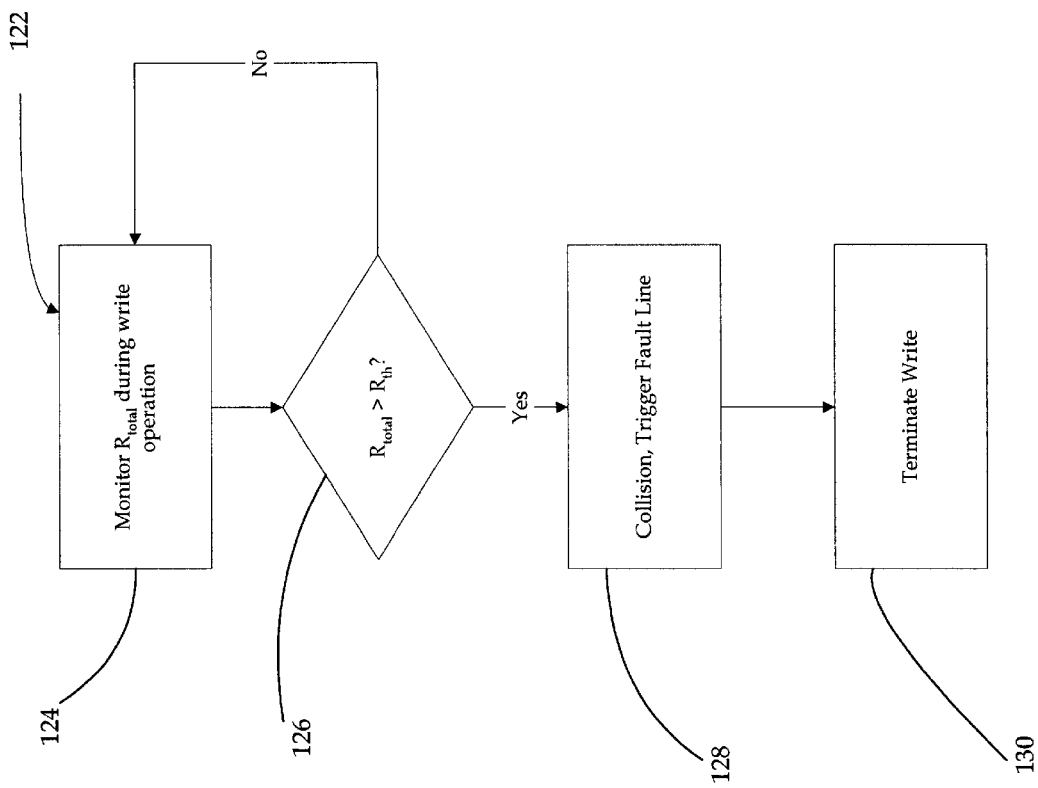
FIG. 4 is a flow diagram of a method in accordance with an embodiment of the present invention.

FIG. 4 is a flow chart illustrating a method 122 that can be implemented into drive firmware in order to detect write head collisions in accordance with embodiments of the present invention. Method 122 begins at block 124 where the total resistance of the MR head, $R_{total}$ is monitored during the write operation. At block 126, $R_{total}$ is compared with a pre-selected threshold $R_{th}$. If $R_{total}$ does not exceed $R_{th}$, control returns to block 124 thus creating a loop that executes until $R_{total}$ exceeds $R_{th}$. When $R_{total}$ exceeds $R_{th}$, the method executes block 128 where a collision trigger fault is generated. This fault may take the form of any suitable signal requiring any suitable corrective action. Once the appropriate corrective action is taken, control passes to block 130 where the write operation is terminated.

From the above description, a number of embodiments are apparent. For example, in one embodiment an apparatus and associated method of detecting a head collision during a write operation of a disc drive includes the following steps. First, a resistance of a magnetoresistive (MR) element is monitored during the write operation to detect an increase in temperature of the MR element. Then, the relative magnitude of the increase in temperature is measured. Finally, a detection output is generated based upon the relative magnitude. The resistance can be monitored in at least two ways. First, it can be monitored by repeatedly measuring a voltage across the MR element and calculating the resistance. Second, it can be monitored by repeatedly measuring current passing through the MR element and calculating the resistance. One preferred detection output is in the form of a signal that causes the drive to retry the write operation. Embodiments of the invention are particularly applicable to drives employing GMR head elements. In a preferred embodiment, the magnitude of the relative increase is measured by comparing a resistance corresponding with the increased temperature with a pre-selected threshold.

In another illustrative embodiment, a disc drive includes a number of elements and can detect when a disc drive head collision occurs during write operations. The disc drive includes at least one rotatable disc adapted for storing data thereon. A spindle motor is coupled to the disc to rotate it. One or more read/write heads, each having a magnetoresistive (MR) element, are positioned near a respective disc surface for reading and writing data. Read/write circuitry is coupled to the head(s) to read data from and write data to the disc(s). A controller is operably coupled to the head(s) and is adapted to detect a temperature increase on the read/write head(s) during the write mode.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the drive while maintaining substantially the same functionality without departing from the scope and spirit of the present invention. In addition, although the preferred embodiment described herein is directed to detecting collisions during write operations in a magnetic disc storage system, it will be appreciated by those skilled in the art that the teachings of the present invention can be applied to other systems that employ MR elements and write data magnetically to a disc, without departing from the scope and spirit of the present invention.

What is claimed is:

1. A method of detecting a head collision between a rotating disc and the head as the head flies spaced from the disc during a write operation of a disc drive, the method comprising:

a) monitoring a resistance of a magnetoresistive (MR) element during the write operation to detect an increase in temperature of the MR element due to the collision;

b) measuring a relative magnitude of the increase in temperature; and c) generating a detection output based upon the relative magnitude.

2. The method of claim 1, wherein monitoring the resistance includes repeatedly measuring a voltage across the MR element and calculating the resistance.

3. The method of claim 1, wherein monitoring the resistance includes repeatedly measuring current passing through the MR element and calculating the resistance.

4. The method of claim 1, wherein the detection output causes the drive to retry the write operation.

5. The method of claim 1, wherein the MR element is a giant magnetoresistive (GMR) element.

6. The method of claim 1, wherein measuring the relative magnitude includes comparing a resistance corresponding with the increased temperature with a pre-selected threshold.

7. A disc drive comprising:

at least one rotatable disc adapted for storing data thereon;

a spindle motor coupled to the at least one disc for rotating the disc;

at least one read/write head having a magnetoresistive (MR) element, the head flying spaced from a disc surface of the at least one rotatable disc, and adapted to write data to the disc surface during a write mode; and read/write circuitry coupled to the at least one read/write head to read data from and write data to the at least one disc; and a controller operably coupled to the at least one read/write head and adapted to detect a temperature increase due to collision between the head and the disc.

8. The disc drive of claim 7, wherein the magnetoresistive element is a Giant Magnetoresistive (GMR) element.

9. The disc drive of claim 7, wherein the MR element has a resistance that varies with temperature, and wherein the controller is adapted to monitor the resistance of the MR element.

10. The disc drive of claim 9, wherein the controller is adapted to compare the resistance with a pre-selected threshold resistance and provide an output indicative of collision based upon the comparison.

11. The disc drive of claim 7, and further comprising:

a preamplifier operably interposed between the MR element and the read/write circuitry, the preamplifier providing a signal indicative of the resistance of the MR element.

12. The disc drive of claim 11, wherein the signal provided by the preamplifier is a voltage signal.

13. The disc drive of claim 11, wherein the signal provided by the preamplifier is a current signal.

14. A disc drive comprising:

at least one rotatable disc adapted for storing data thereon;

a spindle motor coupled to the at least one disc for rotating the disc;

at least one read/write head having a magnetoresistive (MR) element, the head flying spaced from a disc surface of the at least one rotatable disc, and adapted to write data to the disc surface during a write mode; and read/write circuitry coupled to the at least one read/write head to read data from and write data to the at least one disc; and means for detecting a temperature increase due to a collision between the head and the disc on the read/write head during the write mode.

* * * * *

UNITED STATES PATENT AND TRADEMARK OFFICE
CERTIFICATE OF CORRECTION

PATENT NO.     : 6,822,814 B2
DATED          : November 23, 2004
INVENTOR(S)    : WeiLoon Ng et al.

It is certified that error appears in the above-identified patent and that said Letters Patent is hereby corrected as shown below:

Title page,
Item [73], Assignee, "JPMorgan Chase Bank, As Collateral Agent, New York (US)" should be -- Seagate Technology LLC, Scotts Valley, California (US) --

Signed and Sealed this

Eighth Day of February, 2005

JON W. DUDAS
*Director of the United States Patent and Trademark Office*